(12) United States Patent
Eden et al.

(10) Patent No.: US 6,541,915 B2
(45) Date of Patent: Apr. 1, 2003

(54) HIGH PRESSURE ARC LAMP ASSISTED START UP DEVICE AND METHOD

(75) Inventors: James Gary Eden, Mahomet, IL (US); Ju Gao, Champaign, IL (US); Sung-Jin Park, Yong-In (KR); Clark J. Wagner, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/911,352

(22) Filed: Jul. 23, 2001

(65) Prior Publication Data

US 2003/0015969 A1 Jan. 23, 2003

(51) Int. Cl.[7] .................................................. H01J 17/04
(52) U.S. Cl. ......................... 315/60; 313/491; 313/631
(58) Field of Search ............................ 315/55–62, 246; 313/491, 574–576, 631, 632, 605

(56) References Cited

U.S. PATENT DOCUMENTS

| | | | | |
|---|---|---|---|---|
| 4,992,703 A | * | 2/1991 | Ramaiah ...................... 315/60 |
| 5,686,789 A | | 11/1997 | Schoenbach et al. ........ 313/491 |
| 6,139,384 A | * | 10/2000 | DeTemple et al. ............ 445/24 |
| 6,194,833 B1 | * | 2/2001 | DeTemple et al. .......... 313/631 |

OTHER PUBLICATIONS

L. C. Pitchford, I. Pérès, K. B. Liland, J. P. Boeuf, and H. Gielen, *J. Appl. Phys.* 82, 112 (1997).
J. F. Waymouth, *IEEE Trans. Plasma Sci.* 19, 1003 (1991).
R. H. Stark and K. H. Schoenbach, *J. Appl. Phys.* 85, 2075 (1999).
A.D. White, "New Hollow Cathode Glow Discharge", *Journal of Applied Physics*, vol. 30, No. 5, May 1959, pp. 711–719.
K.H. Schoenbach, R. Verhappen, T. Tessnow, and F.E. Peterkin, and W.W. Byszewski, "Microhollow cathode discharges", *Appl. Phys. Lett.* 68(*1*), Jan. 1, 1996, pp. 13–15.

(List continued on next page.)

*Primary Examiner*—Don Wong
*Assistant Examiner*—Wilson Lee
(74) *Attorney, Agent, or Firm*—Greer, Burns & Crain, Ltd.

(57) ABSTRACT

Start-up and re-ignition of a high pressure arc lamp are aided by injection of electrons toward a high pressure arc lamp electrode. A microdischarge device directs electrons toward an electrode of the arc lamp and is preferably turned off during normal operation of the arc lamp. The harsh environment of an arc lamp requires the microdischarge to be made from robust materials, such as ceramics, semiconductors or tungsten, for example. In the present invention, the discharge design must allow, preferably through a screen anode, for the escape of electrons from the microdischarge. This invention results in a decrease in the voltage required to start-up or re-ignite a lamp.

15 Claims, 3 Drawing Sheets

OTHER PUBLICATIONS

J.W. Frame, D.J. Wheeler, T.A. DeTemple, and J.G. Eden, "Microdischarge devices fabricated in silicon", *Appl. Phys. Lett 71(9)*, Sep. 1, 1997, pp. 1165–1167.

Leopold D. Biborosch, Okiver Bilwatsch, Shlomo Ish–Shalom, Eduard Dewald, Uwe Ernst, and Klaus Frank, "Microdischarges with plane cathodes", *Applied Physics Letters*, vol. 75, No. 25, Dec. 20, 1999, pp. 3926–3928.

Ahmed El–Habachi, Wenhui Shi, Mohamed Hoselhy, Robert H. Stark, and Karl H. Schoenbach, "Series operation of direct current xenon chloride excimer sources", *Journal of Applied Physics*, vol. 88, No. 6, Sep. 15, 2000, pp. 3220–3224.

J.W. Frame, P.C. John, T.A. DeTemple, and J.G. Eden, "Continuous–wave emission in the ultraviolet from diatomic excimers in a microdischarge," *Applied Physics Letters*, vol. 72, No. 21, May 25, 1998, pp. 2634–2636.

S.J. Park, C.J. Wagner, and J.G. Eden, *Fellow, IEEE* "Performance of Microdischarge Devices and Arrays with Screen Electrodes", *IEEE Photonics Technology Letters*, vol. 13, No. 1, Jan. 1, 2001, pp. 61–63.

S.J. Park, C.J. Wagner, C.M. Herring, and J.G. Eden, "Flexible microdischarge arrays: Metal/polymer devices", *Applied Physics Letters*, vol. 77, No. 2, Jul. 10, 2000, pp. 199–201.

J.W. Frame and J.G. Eden, "Planar microdischarge arrays", *Electronics Letters*, vol. 34, No. 15, Jul. 23, 1998, pp. 1–2.

S.J. Park, J. Chen, C. Liu and J.G. Eden, "Arrays of microdischarge devices having 50–100μm square pyramidal Si anodes and screen cathodes", *Electronics Letters*, vol. 37, No. 3, Feb. 1, 2001, pp. 1–2.

* cited by examiner

HIGH PRESSURE ARC LAMP ASSISTED START UP DEVICE AND METHOD

STATEMENT OF GOVERNMENT INTEREST

This invention was made with United States Government support under Contract No. F49620-98-1-0030 awarded by the U.S. Air Force Office of Scientific Research (AFOSR). The Government has certain rights in this invention.

FIELD OF THE INVENTION

The field of the invention is arc lamps such as metal-halide, sodium, mercury or rare gas lamps.

BACKGROUND OF THE INVENTION

High-pressure arc lamps (including metal-halide, sodium, mercury, and rare gas lamps and often referred to as high intensity discharge lamps) currently produce, on a continuous basis, several billion watts of visible light worldwide. A major factor limiting the life of these lamps is the process of starting and re-igniting the lamp. The startup or re-ignition of an arc lamp requires the production of charge carriers and, in conventional lamps, this is normally done by imposing a large voltage across the lamp. This voltage creates an electric field between the discharge electrodes that ionizes a fraction of the gas atoms or molecules in this region. The positive ions (anions) and electrons produced by ionization are drawn, under the influence of the electric field, to the cathode and anode, respectively, giving rise to a current. Near the cold cathode, the anions normally are responsible for carrying most of the current. As they approach the cathode, the anions are accelerated in a strong electric field and, upon impact with the cathode, cause the release of secondary electrons from the cathode. In the early stages of the start up of an arc lamp this is the dominant source of electron production near the cathode. Unfortunately, when an ion collides with the cathode, sputtering of the cathode also occurs. Some of the sputtered cathode material (generally a metal or alloy such as thoriated tungsten) coats the inside of the envelope of the lamp, thereby reducing the fraction of the light produced by the lamp that is able to escape. This process is called wall darkening. Each time the lamp is ignited or re-ignited, the operating life of the lamp is reduced further by this process.

SUMMARY OF THE INVENTION

The invention assists in the cold startup or re-ignition of a high-pressure arc lamp. One or more microdischarge devices produces and injects electrons and ions into the region between the cathode and anode. The microdischarge device(s) do not serve as the cathode itself but augment electron and ion production in the early stages of lamp ignition or re-ignition. Once the glow (and arc) is firmly established between the anode and cathode, the microdischarge device(s) can be extinguished and the lamp will function in a conventional manner.

BRIEF DESCRIPTION OF THE DRAWINGS

Other objects, features and advantages of the invention will be apparent to those skilled in the art by reference to the detailed description and the drawings, of which.

DETAILED DESCRIPTION OF THE PREFERRED EMBODIMENTS

Microdischarge device, as the term is used herein, refers to a device in which an electric discharge is produced in a microcavity having dimensions typically less than 500 $\mu$m. A suitable exemplary discharge device is described in U.S. Pat. No. 6,016,027. For this invention, the placement of one or more microdischarge devices within the envelope of an arc lamp exposes them to a harsh environment. Consequently, the microdischarge devices must be made from robust materials such as ceramics, tungsten, molybdenum, and other materials resistant to high temperature and aggressive chemical environments. In order to extract electrons from the microdischarge for injection into the main lamp discharge, the microdischarge anode is in the form of a metal screen although other anode geometries, such as an annular, are also acceptable.

Figure 1:
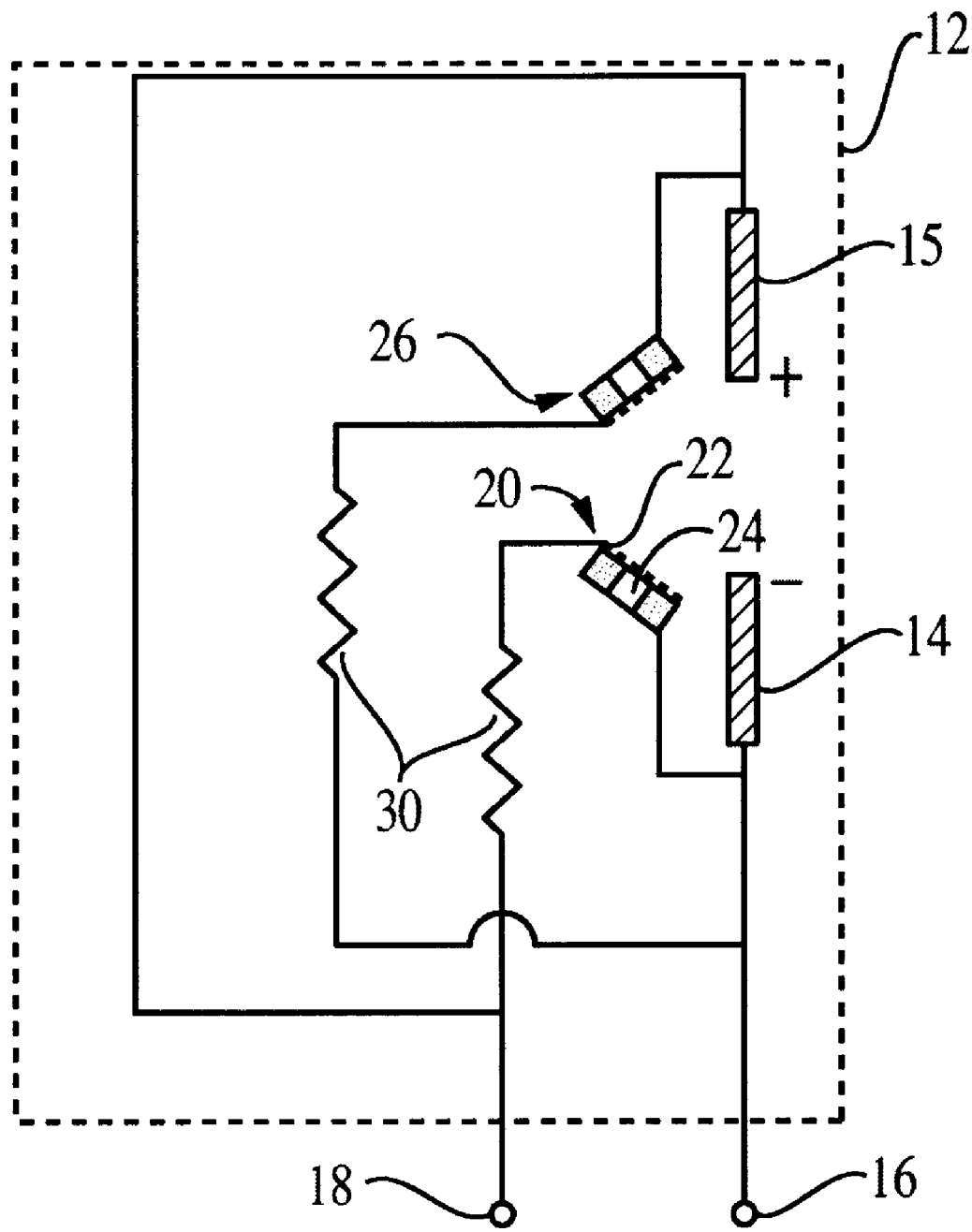
FIG. 1 is a schematic representation of an arc lamp of the invention.

A schematic diagram of an arc lamp incorporating the invention is illustrated in FIG. 1. A housing 12, which is typically quartz, encloses the lamp, which includes conventional electrodes 14 and 15 (generally tungsten or thoriatedtungsten) and a discharge medium. The latter is typically a rare gas, and metal-halide or metal vapor(s). Metal-halide arc lamps, for example, generally have within the envelope approximately 50 Torr (room temperature pressure) of argon gas and a combination of metal-halide salts, including the iodides of scandium and sodium. Mercury or sodium vapors are other commonly used discharge media.

In a conventional lamp, the application of an AC voltage to electrodes 14 and 15 via power terminals 16 and 18 produces an arc between the electrodes. However, breakdown of the lamp gas typically also requires the application of a voltage pulse (or series of pulses) of several kilovolts to the electrodes 14 and 15. The apparatus for accomplishing this is not shown in FIG. 1 since eliminating this pulse entirely or minimizing its voltage is one advantage provided by the present invention.

In FIG. 1, a first microdischarge device 20, including screen anode 22 and hollow cathode 24, is positioned so as to direct electrons, produced within the microdischarge device 20, toward electrode 14. The hollow cathode 24 of the microdischarge device 20 is electrically connected to electrode 14 and the screen anode 22 is connected electrically to electrode 15 through a resistor. The presence of this resistance is not required for the invention to operate but may be desirable in ensuring that the microdischarge device turns off once the arc between electrodes 14 and 15 is firmly established.

Consider first the operation of microdischarge device 20, during the half-cycle of the AC voltage when electrode 14 is the cathode. Electrode 15 is the anode for the main discharge and microdischarge 20 operates with screen 22 serving as the anode and the hollow cathode 24 as the cathode. During this half-cycle, electrons produced in the microdischarge accelerate towards screen 22 and some pass through, continuing on in the direction of electrode 14. After moving a short distance, the electrons ionize rare gas atoms and, because of the gas pressures typically present within the lamp envelope, the electrons and ions migrate in pairs by ambipolar diffusion to the region between electrodes 14 and 15. As this injected (or seed) charge arrives in the region between the main electrodes, it is multiplied by the process of avalanche in which electrons, accelerated by the electric field, ionize background gas atoms, thus producing more electrons. In summary, it is the seed charge, produced by the microdischarge and multiplied rapidly in the region between electrodes 14 and 15, that is responsible for both accelerating the ignition of the lamp and reducing the voltage required for the lamp to start. Therefore, during this half-cycle of the AC voltage waveform, microdischarge device 20 is effective in injecting electrons and ions into the region between 14 and 15, thereby assisting in the ignition of a lamp.

On the next half-cycle of the AC voltage waveform, the polarity of the voltage imposed on electrodes 14 and 15 switches. Electrode 14 is now the anode for the main discharge, electrode 15 is the cathode and although microdischarge device 20 still produces electrons, screen 22 is now the cathode for device 20 and element 24 is its anode. Thus, the electrons produced in microdischarge device 20 exit the device through anode 24, away from electrode 14.

Thus, the microdischarge device 20 is responsible for injecting electrons into the region between electrodes 14 and 15, but does so only during the half-cycle in which electrode 14 is the cathode. During the other half-cycle, device 20 is of little value. Lamp ignition may be assisted during both half-cycles of the AC voltage by use of a second microdischarge device 26 near the other electrode (electrode 15). Consequently, during the half-cycle in which microdischarge device 20 is not effective, microdischarge device 26 will inject plasma into the region between electrodes 14 and 15 and as, before, the avalanche process rapidly increases the conductivity, causing the lamp to ignite quickly and at a voltage substantially smaller than that required normally (i.e. in the absence of a microdischarge). Therefore, during both half-cycles of the voltage waveform, microdischarge devices 20 and 26 are alternatively delivering electrons and ions into the region in which the arc discharge is to occur. This function diminishes the voltage required for arc ignition to occur and reduces the time required for the lamp to start-up. Though a single microdischarge device is necessary for the practice of this invention, the use of the multiple microdischarge devices in FIG. 1 provides for start-up and re-ignition assistance during both the positive and negative half-cycles of an AC voltage applied to terminals 16 and 18.

With a properly selected size (resistance) for resistors 30, the voltage across the microdischarge can be set such that microdischarge 20 (and 26) is on only during the start-up phase of the lamp. As an arc discharge between electrodes 14 and is established, the voltage between these electrodes declines, thereby also decreasing the voltage imposed on microdischarge 20. Hence, for a given lamp medium and design (anode-cathode gap, gas fill pressure, etc.), one can determine the value of resistors 30 required to cause microdischarge 20 to cease operation at approximately the desired point in the lamp start-up process. Using resistors 30 to extinguish microdischarges 20 and 26 is preferred but not necessary to practice the invention. The microdischarges 20 and 26 will not adversely affect lamp operation if left functioning after start up or reignition, but may have a shorter lifetime if left to continually operate continuously.

The microdischarges 20 and 26 also serve to aid in re-igniting a hot lamp. If power is interrupted to a lamp that has been in operation and, hence, is hot, re-starting that lamp is often more difficult than starting a cold lamp. The reason is that a hot lamp has a higher gas or vapor pressure inside the lamp envelope than is present at cold start-up. Therefore, producing the electrons required to re-start the lamp is more difficult and, with present technology, it is often necessary to wait for the lamp to cool somewhat before the lamp can be re-started. Use of a microdischarge assist according to the invention can decrease the time required to re-start a hot lamp. The diameter of the hollow cathode in the microdischarge device may be selected so that the microdischarge device will ignite and operate in a stable manner, even at the high pressures characteristic of a hot lamp. Some lamps when hot have internal pressures of several atmospheres (or more) and, although the maximum pressure at which a microdischarge device can operate is not known, we have operated devices, 30 $\mu$m in diameter, at pressures of 1200 Torr (more than 1½ atmospheres absolute pressure), which is limited by our vacuum system. In general, the smaller the diameter of the cathode of the microdischarge device, the higher the pressure at which one can operate the device. Thus, by choosing the cathode diameter properly, microdischarge devices 20 and 26 in FIG. 1 will be effective in starting the lamp, irrespective of whether it is cold or not.

Figure 2A:
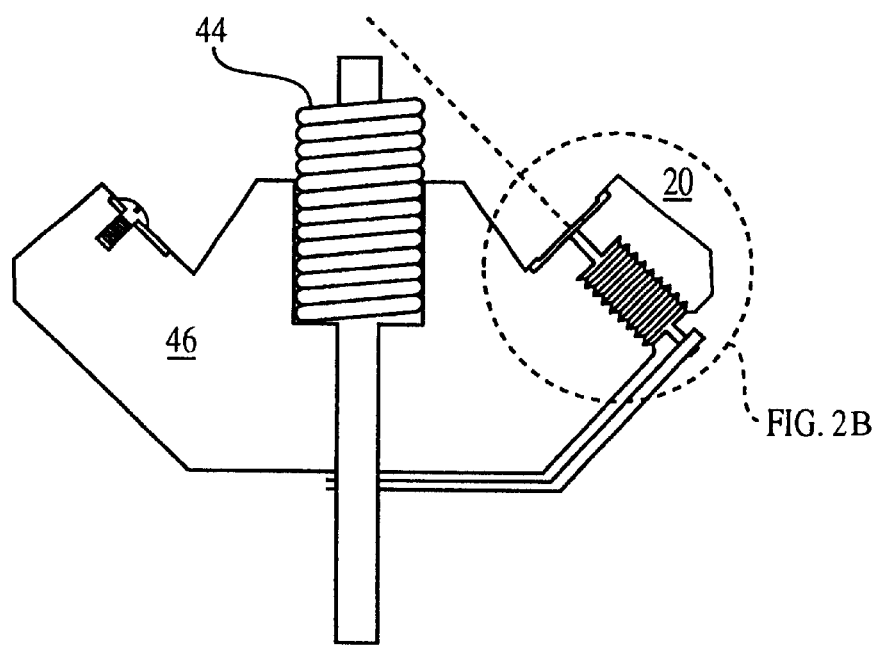
FIG. 2A is a detailed schematic representation of an electrode and microdischarge from FIG. 1, shown in a side view.
Figure 2B:
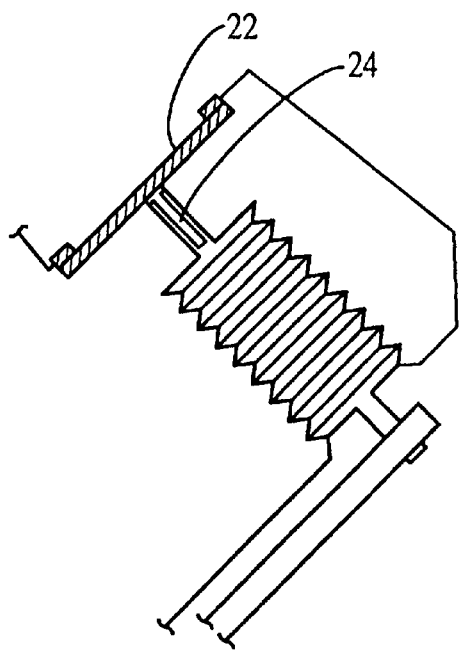
FIG. 2B is an enlarged view of a portion of FIG. 2A.

A wide range of microdischarge array configurations other than that shown in FIG. 1 may be used. One example is shown in FIG. 2, which illustrates an array of three (or more) microdischarge devices arrayed symmetrically around a tungsten electrode 44. The assembly is machined from a ceramic 46 or other robust, high temperature material. This array has been constructed and tested. For these tests, the microdischarge assembly was fabricated from a machinable ceramic and the three microdischarge devices were installed in the assembly so as to lie in the same plane (transverse to the axis of the two main electrodes) but separated azimuthally by 120. Each microdischarge device consisted of a ~400 $\mu$m diameter cylindrical hollow cathode (made from molybdenum) and a metal screen anode. The anode-cathode gap for each of the three microdischarges was set to ~250 $\mu$m. The electrodes for the main discharge are thoriated-tungsten electrodes identical to those in commercial metal-halide arc lamps. Each microdischarge was oriented such that the tip of the cathode is in the line-of-sight of each microdischarge as defined by its axis. This precise alignment is not necessary for the operation of the invention.

Figure 3:
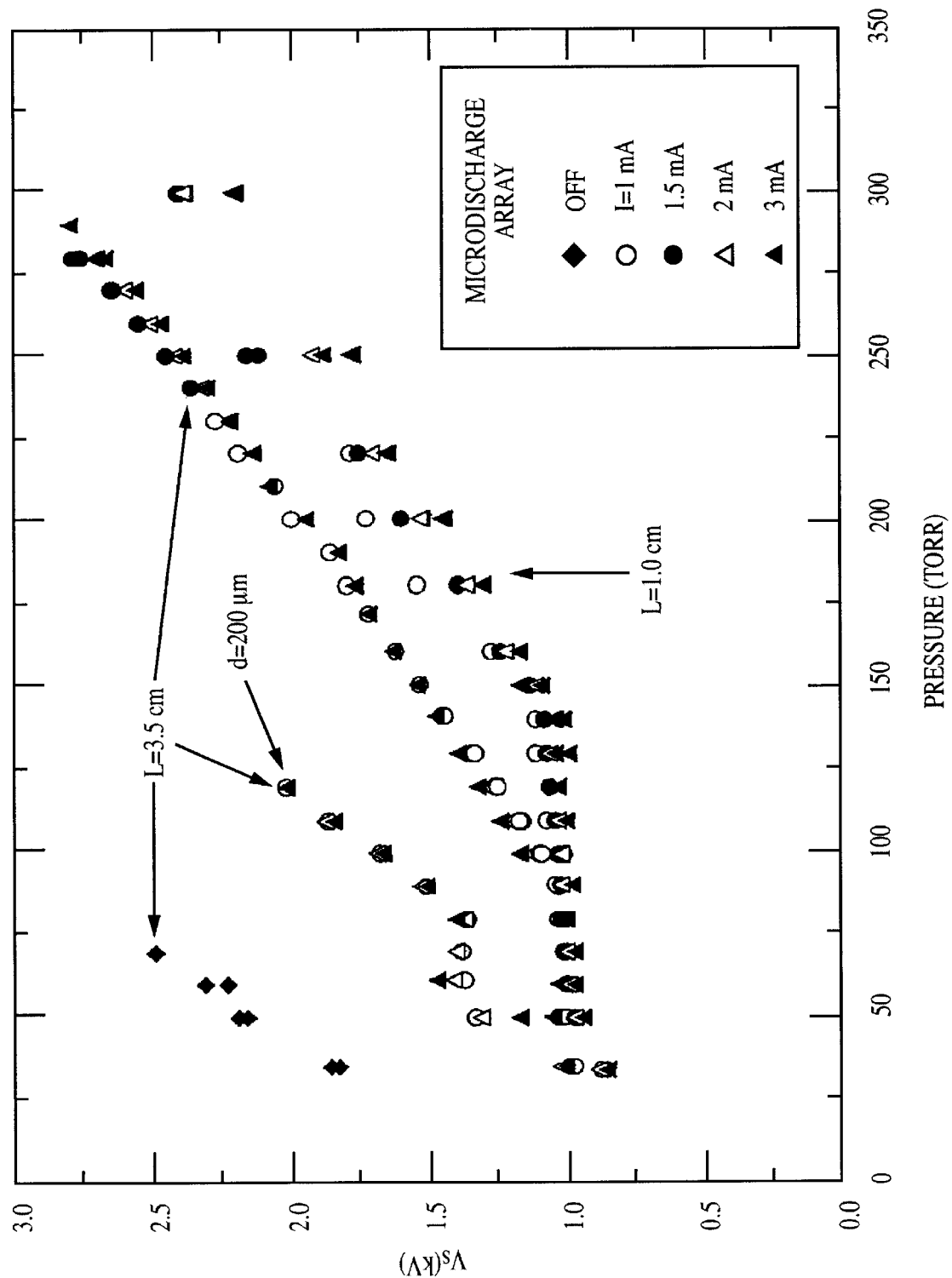
FIG. 3 is a graph showing the reduction in the cold startup voltage of a lamp when a microdischarge array injects electrons and ions into the region near the cathode.

FIG. 3 shows the reduction in starting voltage for a high pressure discharge in argon gas between the two tungsten electrodes when the microdischarge array is operating. Data are shown for Ar gas pressures between 35 Torr and 290 Torr. When the microdischarge array is disabled, the voltage required to ignite the discharge for a 3.5 cm gap between the anode and cathode is quite high, ranging from ~1.8 kV for 35 Torr of Ar to approximately 2.5 kV for 75 Torr of Ar. With the microdischarge array in operation, however, a significant reduction in the starting voltage is observed. For an Ar pressure between 35 and 90 Torr (which is the typical fill pressure range for a metal-halide lamp), the starting voltage is now only ~1 kV. Notice, too, that the improvement in starting voltage afforded by the microdischarge array is even larger at higher gas pressures. In this region, the starting voltage, ($V_s$) rises linearly with fill gas pressure p so as to render $V_s/p$ constant. In FIG. 3, data are also shown for a tungsten anode-cathode gap of L=1.0 cm and 200 $\mu$m diameter hollow cathode microdischarges. In the latter case, L is 3.5 cm.

Although the data of FIG. 3 were acquired for DC voltages, and microdischarge devices on one electrode, the invention is also effective when an AC voltage drives the lamp. In this instance, microdischarges on one or both electrodes will, as discussed earlier, improve lamp ignition characteristics.

Furthermore, other microdischarge array configurations and positions as well as microdischarge designs lie within the scope of this invention. For example, other cathode designs and materials such as the use of carbon nanotubes as the electron emitter are acceptable. In this case, the carbon nanotubes may, in one configuration, be affixed to a disc mounted behind one or both tungsten electrodes. With a screen anode mounted above the nanotubes, such a structure will act as a multi-element electron emitter analogous to that described earlier. Also, rather than having cylindrical symmetry, the microdischarge can have a slotted cathode. Therefore, while specific embodiments of the present invention have been shown and described, it should be understood that other modifications, substitutions and alternatives (such as other anode configurations) are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An arc lamp ignition system, the arc lamp including a high-pressure housing enclosing a gas, and a pair of spaced apart electrodes connected to power feed terminals, the lamp ignition system being within the housing and comprising:
   a microdischarge device disposed to direct electrons toward one of the pair of spaced apart electrodes, wherein
   said microdischarge device comprises a microcavity forming a cathode in a dielectric body and a screen anode formed over the microcavity to permit escape of electrons therefrom; and
   said microdischarge is configured and supplied with power from the power feed terminals to turn on at least during a period of higher supply voltage caused by start-up or re-ignition of said lamp.

2. The arc lamp ignition system of claim 1, further comprising a step down voltage connection to connect said microdischarge device to the power feed terminals to regulate voltage to said microdischarge device to turn on said microdischarge device during a period of higher supply voltage caused by start-up or re-ignition of said lamp and to turn off said microdischarge device during a period of normal lamp operation.

3. The arc lamp ignition system according to claim 2, further comprising: a second microdischarge device disposed to direct electrons toward another one of the pair of spaced apart electrodes,
   a second step down connection to connect said second microdischarge device to the power feed terminals in an opposite polarity, wherein
   said second step down connection regulates voltage to said second microdischarge device to turn on said second microdischarge device during a period of higher supply voltage caused by start up or reignition of said arc lamp and to turn off said second microdischarge device during a period of normal supply voltage.

4. The arc lamp ignition system according to claim 1, further comprising:
   a second microdischarge device disposed to direct electrons toward another one of the pair of spaced apart electrodes.

5. The arc lamp ignition system according to claim 1, wherein said microdischarge device is formed as a cylindrical microdischarge including a hollow cathode microcavity.

6. The arc lamp ignition system according to claim 5, wherein said microdischarge device includes multiple hollow cathode microcavity devices directed toward said one of the pair of spaced apart electrodes.

7. The arc lamp ignition system according to claim 6, wherein said multiple hollow cathode microcavity devices are symmetrically arranged around said one of the pair of spaced apart electrodes.

8. An arc lamp comprising:
   a high-pressure housing enclosing a discharge gas;
   spaced apart electrodes within said housing;
   power feed terminals forming a circuit with said spaced apart electrodes to induce completion of a circuit by an arc between said spaced apart electrodes under a sufficient voltage condition; and
   a microdischarge device disposed to direct electrons toward one of the pair of spaced apart electrodes, wherein
   said microdischarge device comprises a microcavity forming a cathode in a dielectric body and a screen anode formed over the microcavity to permit escape of electrons therefrom; and
   said microdischarge is configured and supplied with power from the power feed terminals to at least turn on during a period of higher supply voltage caused by start-up or re-ignition of said lamp.

9. The arc lamp ignition system of claim 8, further comprising a step down voltage connection to connect said microdischarge device to the power feed terminals to regulate voltage to said microdischarge device to turn on said microdischarge device during a period of higher supply voltage caused by start-up or re-ignition of said lamp and to turn off said microdischarge device during normal lamp operation.

10. The arc lamp according to claim 9, further comprising:
    a second microdischarge device disposed to direct electrons toward another one of the pair of spaced apart electrodes,
    a second step down connection to connect said second microdischarge device to the power feed terminals in an opposite polarity, wherein
    said second step down connection regulates voltage to said second microdischarge device to turn on said second microdischarge device during a period of higher supply voltage caused by start up or reignition of said arc lamp and to turn off said second microdischarge device during a period of normal lamp operation.

11. The arc lamp ignition system according to claim 8, further comprising: a second microdischarge device disposed to direct electrons toward another one of the pair of spaced apart electrodes.

12. The arc lamp ignition system according to claim 8, wherein said microdischarge device is formed as a cylindrical microdischarge including a hollow cathode microcavity.

13. The arc lamp ignitions system according to claim 12, wherein said microdischarge device includes multiple hollow cathode microcavities directed toward said one of the pair of spaced apart electrodes.

14. The arc lamp ignition system according to claim 13, wherein said multiple hollow cathode microcavities are symmetrically arranged around said one of the pair of spaced apart electrodes.

15. A method for assisting start-up or re-ignition of an arc lamp, the method comprising:
    with a microdischarge device, directing electrons toward a region between electrodes of the arc lamp by having the microdischarge respond to start-up and re-ignition increased voltage conditions of the arc lamp;
    turning off the microdischarge device during a normal operation of the arc lamp.

* * * * *